3,227,686
INTERNALLY PLASTICIZED PHENOLIC RESINS
Chester W. Fitko and Abraham Ravve, Chicago, Ill., assignors to Continental Can Company, Inc., New York, N.Y., a corporation of New York
No Drawing. Filed Sept. 22, 1960, Ser. No. 57,624
13 Claims. (Cl. 260—53)

This invention relates to the preparation of coating compositions and coatings on metal, and is more particularly concerned with the preparation of such materials with a base of internally plasticized phenol aldehyde resin.

Phenol aldehyde, or phenolic, resins yield coating compositions which can be readily applied in solution form to metal such as tin plate, which upon heating cure rapidly to insoluble form, and which then exhibit excellent adhesion. Such cured coatings are hard, non-staining and economical. However, the coatings are brittle, and crack when the coated metal sheet is fabricated, e.g., during the bending and stretching to form the sheet material into cans; and the broken film fragments will separate from the metal substrate.

Furthermore, enamels containing phenol-formaldehyde resins are very sensitive to impure metal surfaces, particularly when the surface is contaminated with oils or organic esters such as dioctyl sebacate. The enamel then tends to dewet readily; that is, uniform wetting is not attained.

Another serious drawback of enamels containing phenol-aldehyde resins is the poor flow-out or leveling behavior of the enamels upon roll-coating application on metal surfaces.

It has been sought to reduce this brittleness and improve flow-out and wetting by the addition of external plasticizers such as a co-soluble alkyd resin, ester gum or organic acetate; but when the proportion is effective to eliminate brittleness during fabrication, it also slackens the cure of the phenol aldehyde resin and provides a weaker, softer coating. Furthermore, such external plasticizers are present as components of physical mixtures, without chemical combination, and can leach out upon contact with the intended contents of some containers, particularly when a food product is involved and thermal processing is necessary for sterility. Furthermore, otherwise desirable external plasticizers often tend to be only partially compatible with phenolic resins, so that resin separation results.

It has been found that the difficulties can be avoided by internal plasticization of phenolic resins through the presence of aliphatic mono-substitutions in the polymer resin molecule. This can be accomplished by partial replacement, of the simple phenol employed with the aldehyde in forming the phenolic resin, by a phenol having an aliphatic side group of 8 to 18 carbon atoms. It has been found feasible to plasticize phenol-aldehyde resins by employment of open-chain aliphatic components in side groups on the phenol nucleus. 28 to 40 percent plasticization by weight of polymer appears to yield the desired results.

Furthermore, the resin must be thermosetting to perform satisfactorily as a phenolic can liner. Resins from phenols with the lower-carbon side chain aliphatic groups do not yield satisfactory plasticization in essentially all proportions. When the proportion is high, e.g., that for attaining 50 percent plasticization (based on the alkyl group) so much of the alkyl phenol is required that there is insufficient cross-linking, and resins result of thermoplastic behavior. When the proportion is low, the necessary non-brittleness is not attained: and the effect of intermediate ratios is coupled with the conditions of the phenol-aldehyde chain coupling and of the curing. On the other hand, the higher aliphatic hydrocarbon side chains, with eight or more carbon atoms (octyl and beyond), yield the desired results.

Unsubstituted phenol is trifunctional and leads to thermosetting resins in the reaction with aldehydes. Monosubstituted phenols alone (except for meta substitutions) are only bifunctional and by themselves will form only thermoplastic polymers. Thus, to obtain the desired amount of plasticization and still maintain sufficient amounts of cross-linking (thermosetting properties), the higher substituted phenols are imperative as they permit more unsubstituted phenol to be present in the finished resin.

As compared to open-chain substitutions, when cyclic structures are used, such as p-phenyl phenol, the phenyl group through its planar structure does not act as a plasticizer. It actually causes embrittlement of the resin. The hydrogenated derivative of p-phenyl phenol, cyclohexyl phenol, is no longer planar but, due to the cyclic structure, does not allow sufficient molecular mobility in the resin and acts with poor efficiency as a plasticizer.

An object of the invention is the preparation of a coating composition containing a phenolic resin having aliphatic side chains effective for internal plasticizing.

Another object is the preparation of a metal coating containing a cured phenolic resin having aliphatic side chains effective for internal plasticizing.

Suitable partial substitutions for the simple phenol or hydroxybenzene in forming phenol aldehyde resins according to this invention, are the phenols having a benzene nucleus with the hydroxyl group thereon and a further group or side chain of aliphatic hydrocarbon type containing 8 to 18 carbon atoms, e.g., octyl, nonyl and dodecyl phenols. The alkyl substitution can be at any position relative to the hydroxyl group: but in practice, the para compounds are preferred. The alkyl group can be of straight or branched chain type. The molar amount of alkyl phenol should not greatly exceed the molar amount of simple phenol, for attaining the required three-dimensional cross-linking. The addition must be made within a range of relative proportions of phenols by which the combined resin solids are comprised of about 28 to 40 percent by weight of the alkyl chain, e.g., 0.5 to 1.25 moles of nonyl phenol are employed per mole of the hydroxybenzene, wherewith the alkyl plasticization fraction is 28.8 to 40.0 percent by weight with a nonyl phenol. Generally it has been found that 34–38 percent plasticization by the alkyl groups, computed on the weight basis of the nonyl group to the total polymer, is preferable. The higher percentages of plasticization are not deleterious if the cured resin is sufficiently cross-linked: that is, with the aforesaid ratios of 0.5 to 1.25 moles of nonyl phenol per mole of monohydroxybenzene, the alkyl phenol provides from a quarter to five-eights of the total number of phenol molecules introduced and the monohydroxybenzene provides three-quarters to three-eights. Mixtures of two or more alkyl phenols with monohydroxybenzene may be employed: with maintenance of a ratio of at least three-eighths of the molar amounts as the monohydroxybenzene, and of the presence of sufficient alkyl substitution phenols to provide the plasticity effect.

The condensation of the mixed phenols with aldehyde is conducted with an alkaline catalyst. Tertiary amines, such as triethylamine, have yielded satisfactory results: the alkali metal bases, such as sodium hydroxide, are effective. Other alkaline catalysts employed for phenol: formaldehyde condensation can be used.

A typical preparation procedure employs as components:

EXAMPLE 1

| | Grams |
|---|---|
| Phenol (hydroxybenzene) | 94 |
| Commercial para-nonyl phenol | 275 |
| Formaldehyde (55% methanol solution) | 105 |
| Triethylamine | 45 |

Therein, the phenol:nonyl phenol molar ratio is about 1:1.25; with about 1.915 moles of formaldehyde and 0.2 mole of triethylamine per 2.25 moles of the mixed phenols. The commercial alkyl phenols largely have the alkyl substitution groups in the form of branched aliphatic structures. For example, the substitution group in one commercial octyl phenol has a 4-carbon chain with two methyl side branches at the first and third chain carbons from the phenyl nucleus.

The phenols and aldehyde are mixed, and then the condensation agent is added. The temperature rises to about 48 degrees C. and so continues for about an hour. External heat is then applied, and the reaction mixture held at 70 to 75 degrees C. for an hour. The temperature is then raised to 90 to 95 degrees C. and held for about ten hours. At this stage, the gel time of the resin is about 800 seconds at 130 degrees C. The product, being a B-stage phenolic resin, is separated by vacuum distillation of water and the volatile condensation agents; and then dissolved in a volatilizable organic solvent such as amyl or butyl alcohol to form a liquid coating composition with 40 to 50 percent solids. It can be used as such for a can enamel by brush, spray or roller application. The usual pigments and coloring materials can be added. The metal sheet or can body is then baked for 4 to 10 seconds in an oven at a temperature range of 700 to 1,100 degrees F. for a so-called flash curing; or for 8 to 12 minutes in an oven at a temperature of 385 to 400 degrees F. The coating endures longer heat exposure without damage, e.g., 15 minutes at 400 degrees F., but for economy, it is preferred to employ as short a time as necessary to convert the resin to the C-stage, at which there is present an infusible, insoluble, hard, tough and extensible thermoset coating which remains as a tightly adherent continuous film after the coated sheet has been fabricated, e.g., into can bodies or can ends, which is resistant against breakage or separation under blows which distort the can body or end, and which does not yield off any significant amount of flavor or odor-altering component during heating in contact with aqueous or oily substances.

By comparison, when di-substituted phenols are employed as a partial replacement for the simple phenol, the alkyl phenols lack ability to form the desired extensive condensate chains: and can be regarded as chain terminators in their effect. The molecular weight of the resulting resin is too low to be useful. The commercial nonyl phenol of the above example has some dialkyl phenol as an impurity. In practice, with 5 percent of the dialkyl phenol present in the commercial nonylphenol, it has been found that a critical limit is reached when 1.5 moles of such commercial nonylphenol are employed per mole of simple phenol: that is, above this limiting ratio, the product does not produce a desirable thermoset film. In general, when 10 percent of the dialkyl substitute is present, a satisfactory thermoset structure is not attained. Also, when there are less than 8 carbon atoms in the substituent, a large amount of such alkyl phenol is required to produce a satisfactory internal plasticization: that is, the cured film at satisfactory behavior has an undesirable thermoplastic as compared to thermoset behavior.

EXAMPLE 2

| | Grams |
|---|---|
| Phenol (hydroxybenzene) | 94 |
| Para octyl phenol | 372 |
| Formaldehyde (55% solution in methanol) | 360 |
| Triethylamine | 56 |

The solution of phenol, octyl phenol, formaldehyde and triethylamine was heated at 85 degrees C. for nine hours. Methyl alcohol and triethylamine were distilled off; and the remaining resin was washed three times with 500 ml. of hot water, and separated. Excess water was then removed by vacuum distillation, and the resin diluted to about 30 percent solids with amyl alcohol. The enamel was then ready for use.

Formaldehyde ratios of 0.85 to 2.35 moles of formaldehyde per mole of phenols are usable in the practices of the above examples.

The octyl chain has a lesser weight than the nonyl chain of Example 1; and correspondingly a greater number of such alkyl:phenol molecules may be employed with a given number of molecules of the simple phenol, always observing the need for at least three-eighths of the simple phenol for cross-linkages. Such ratios for octyl and other alkyl chains may be computed on the basis of 28 to 40 percent of the nonyl group: e.g., with octyl phenol, 35 to 55 percent of the octyl group should be present in the polymer.

EXAMPLE 3

The condensation of the same mixed phenols with aldehyde may be performed with an acid catalyst to produce a thermoplastic novolac: and the coating solution can then include an alkaline agent to produce the thermoset form on the metal substrate. Thus, a mixture is prepared of:

| | | |
|---|---|---|
| Phenol | grams | 94 |
| Paraoctylphenol | do | 372 |
| Formalin (55% solution in methanol) | do | 180 |
| 12 N hydrochloric acid solution in water | milliliters | 5 |

The mixture is kept at 40 degrees C. for one hour, then at 60 degrees C. for an hour, and then heated to 95 degrees C. for six hours. The resin is washed with water to remove acid. 300 milliliters of amyl alcohol are added; and the solution dehydrated by azeotropic distillation.

In compounding for use as a coating, after dilution to 30 percent by weight solids with amyl alcohol, 72 grams of hexamethylene tetramine are added. The enamel is applied as a metal coating, and baked as in the above examples.

Such phenol:alkyl phenol novolacs may also be converted to resoles by inter-reaction with formaldehyde and an alkaline catalyst such as triethylamine; or by employing an alkaline-catalyzed phenol:aldehyde stage A or B resin, in place of or in partial substitution for the amine. Due care is taken that the preferred ratio of simple phenol and alkyl phenol components are present in the final products.

The following advantages exist for the resins of this invention, compared to known phenolic resins, when used in enamels: (1) the polymer wets the metal plate more uniformly than the shorter chain substituted phenols and much better than the unsubstituted phenols; (2) there is better flexibility and impact resistance.

Photomicrographs of metal plates enameled with the instant resins, with cresol modified resin, and externally plasticized phenolic resin containing 15 percent polyvinyl butyral as an external plasticizer were compared. These photomicrographs demonstrated poor compatibility in the externally plasticized enamel.

The impact resistance and flexibility of the phenolic resins of this invention have been compared and evaluated with commercially available phenolic enamels on the General Electric impact flexibility tester. This new resin withstood 30 percent stretching with an impact rating of four. The cresol substituted resin withstood 25.2 percent stretching with an impact rating of 3.3. A phenolic resin plasticized externally with 15 percent polyvinyl butyral withstood only 15 percent stretching and had an impact rating of two. In practice, 25 percent stretching and an impact rating of 3 are desirable minima.

The effects of various ratios of the simple phenol and the commercial alkylphenol may be illustrated by the following:

Table 1

|                       | A     | B     | C     | D     | E     | F     | G     | H     | I       |
|-----------------------|-------|-------|-------|-------|-------|-------|-------|-------|---------|
| Phenol, moles         | 1.0   | 1.0   | 1.0   | 1.0   | 1.0   | 1.0   | 1.0   | 1.0   | 1.0     |
| Nonylphenol, moles    | 0     | 0.25  | 0.5   | 0.75  | 1.0   | 1.25  | 1.50  | 3.0   | 6.0     |
| Formaldehyde, moles   | 0.85  | 1.06  | 1.27  | 1.49  | 1.70  | 1.92  | 2.22  | 3.4   | 5.95    |
| Phenol, weight        | 94    | 94    | 94    | 94    | 94    | 94    | 94    | 94    | 94      |
| Nonylphenol, weight   | 0     | 55    | 110   | 165   | 220   | 275   | 330   | 660   | 1,320   |
| Formaldehyde, weight  | 25.5  | 31.8  | 38.2  | 44.7  | 51    | 57.5  | 66.5  | 102   | 178.5   |
| Form yield, weight    | 10.2  | 12.7  | 15.3  | 17.9  | 20.4  | 23.0  | 26.6  | 40.7  | 71.3    |
| Solids. yield         | 104.2 | 161.7 | 219.3 | 276.9 | 334.4 | 392.0 | 450.6 | 794.7 | 1,485.3 |
| Wt. Aliph. group      | 0     | 31.5  | 63    | 94.5  | 126   | 157   | 189   | 378   | 755     |
| Percent Aliph. group  | 0     | 19.4  | 28.8  | 33.9  | 37.8  | 40.0  | 42.0  | 47.5  | 51      |

"Wt. aliph. group" denotes the weight of the alkyl group, with 126 representing the weight of the branched chain substituent in the resin. "Percent aliph. group" denotes the percentage of such group in the resin.

Of these, test A was a control, with no alkyl phenol; the baked film was brittle. Test B had a 1:¼ ratio, and the baked film also was brittle. Tests C to F had ratios of 1:½ to 1:1¼, and the baked film had the characteristics of a plasticized thermoset film. Tests G to I, with ratios of 1:1½ to 1:6, gave baked films which were too soft for can coatings. It is notable that at a ratio of 1:1¼ or 40 percent plasticization, the baked film was useful: while a ratio of 1:1½ or 42 percent plasticization, the baked film was too soft with this commercial alkyl phenol containing about 5 percent of the dialkyl form.

In tests with nonylphenol, it has been found that a ¼:1 ratio of alkylphenol:phenol was brittle; that ½:1 to 1¼:1 gave the desired properties; and that ratios of 1½:1 or over were too soft even upon extended baking and of low strength, even though the increase from 1¼:1 to 1½:1 represents a change of the alkyl group only from 40 to 42 percent.

The examples of practice are not restrictive: and the invention can be practiced in many ways within the scope of the appended claims.

What is claimed is:

1. The method of making an internally plasticized thermosetting resin, which comprises heating with a stage of curing at a temperature of 85 to 95° C. for at least 6 hours a mixture consisting of mono-hydroxybenzene and a para mono-alkyl phenol in which the alkyl side group is of 8 to 12 carbon atoms, the ratio of alkyl phenol to hydroxybenzene being 0.5 to 1.25, with an aldehyde in amount of 0.85 to 2.35 moles per mole of the mixed phenols, and in the presence of a condensing agent.

2. The method as in claim 1, in which the condensing agent is an alkali.

3. The method as in claim 1, in which the alkyl phenol is a nonyl phenol.

4. The method as in claim 1, in which the alkyl phenol is an octyl phenol.

5. The method as in claim 1, in which the alkyl phenol is a dodecyl phenol.

6. The method as in claim 1, in which the condensing agent is a tertiary amine.

7. The method as in claim 1, in which the condensing agent is an acid, and wherein the mixture of mono-hydroxy benzene, para mono-alkyl phenol, and the aldehyde are heated to a further stage of curing in the presence of an aldehyde and an alkali.

8. A thermosetting liquid composition for coating metal, consisting of a solution in a volatizable organic solvent of a condensate polymer resin prepared from formaldehyde and a mixture of hydroxybenzene and alkyl phenol in the proportions of 0.5 to 1.25 moles of alkyl phenol computed as monoalkyl phenol, to one mole of hydroxybenzene, the alkyl phenol being predominantly a para mono-alkyl substituted phenol with less than 10 percent of dialkyl phenol, the formaldehyde being present during the preparation in the amount of 0.85 to 2.35 moles thereof per mole of the mixed phenols, the alkyl substituent being selected from the hydrocarbon group with 8 to 18 carbon atoms and the alkyl group comprising 28 to 40 percent of the polymer resin and the preparation having been accomplished by heating for 8 to 12 hours at a temperature not exceeding 95° C. and including a final heating for at least 6 hours at a temperature of 85 to 95 degrees C.

9. A composition as in claim 8, in which the monoalkyl group is of branched hydrocarbon structure.

10. An article comprising a metal substrate having a a coating thereon comprising the baked phenolic resin of claim 9.

11. A composition as in claim 8, in which the alkyl phenol is a commercial nonyl phenol of branched nonyl type, and containing about 5 percent of dinonyl phenol.

12. A composition as in claim 8, in which the alkyl phenol has the alkyl group of branched octyl type.

13. An article comprising a metal substrate having a coating thereon comprising the thermoset baked phenolic resin of claim 8.

References Cited by the Examiner

UNITED STATES PATENTS

| 2,101,944 | 12/1937 | Honel | 260—53 |
| 2,121,642 | 6/1938 | Rosenblum | 260—53 |
| 2,345,357 | 3/1944 | Powers | 260—53 |
| 3,053,807 | 9/1962 | Lederman et al. | 260—53 |

WILLIAM H. SHORT, *Primary Examiner.*

M. STERMAN, N. G. TORCHIN, *Examiners.*